(12) United States Patent
Phillips

(10) Patent No.: US 7,565,935 B1
(45) Date of Patent: Jul. 28, 2009

(54) POWERED TAP DRIVER WITH ROTARY CONTROL STRUCTURE

(76) Inventor: Robert E. Phillips, 4 Country Glen Rd., Fallbrook, CA (US) 92028

( * ) Notice: Subject to any disclaimer, the term of this patent is extended or adjusted under 35 U.S.C. 154(b) by 423 days.

(21) Appl. No.: 11/441,462

(22) Filed: May 26, 2006

Related U.S. Application Data

(60) Provisional application No. 60/779,533, filed on Mar. 6, 2006.

(51) Int. Cl.
*H02K 7/14* (2006.01)
(52) U.S. Cl. .................. 173/176; 173/178; 173/181; 173/217
(58) Field of Classification Search ............. 173/176, 173/178, 181, 217
See application file for complete search history.

(56) References Cited

U.S. PATENT DOCUMENTS

| | | | |
|---|---|---|---|
| 2,152,517 A | 3/1939 | Whitney et al. | |
| 2,618,861 A | 11/1952 | Pettee et al. | |
| 2,941,420 A | 6/1960 | Graybill | |
| 3,165,947 A | 1/1965 | Smith | |
| 3,217,564 A | 11/1965 | Smith | |
| 3,237,484 A | 3/1966 | Smith | |
| 4,277,209 A | 7/1981 | Benjamin et al. | |
| 4,653,338 A | 3/1987 | Yeomans | |
| 5,014,793 A * | 5/1991 | Germanton et al. | 173/181 |
| 5,201,374 A * | 4/1993 | Rahm | 173/178 |
| 5,311,949 A * | 5/1994 | Chapin | 173/217 |
| 5,563,482 A * | 10/1996 | Shaw et al. | 318/272 |
| 6,105,343 A * | 8/2000 | Grove et al. | 53/490 |
| 2003/0196824 A1* | 10/2003 | Gass et al. | 173/131 |
| 2005/0205274 A1* | 9/2005 | Bogue | 173/2 |
| 2006/0233621 A1* | 10/2006 | Schell et al. | 408/124 |
| 2007/0235952 A1* | 10/2007 | Mack | 279/62 |

\* cited by examiner

*Primary Examiner*—Brian D Nash
(74) *Attorney, Agent, or Firm*—Allen A. Dicke, Jr.

(57) ABSTRACT

The tap driver is configured to be hand-held. It has a tap-holding chuck and a motor to drive the chuck. An external switch rocks forward to rotate the motor in the tapping direction and backward to withdraw the tap. A control circuit causes forward motion of the tap for a predetermined time for the tap to make about one forward turn for tapping. At the end of that time, the motor reverses and rotates the tap outward a fractional turn to break the chips made during tapping. The timer then turns the circuit to drive the motor in the forward direction for another tapping. This action repeats until tapping is complete and the switch is rocked back to reverse the motor to withdraw the tap.

14 Claims, 5 Drawing Sheets

POWERED TAP DRIVER WITH ROTARY CONTROL STRUCTURE

CROSS REFERENCE

This application relies for priority on Provisional Application Ser. No. 60/779,533, filed Mar. 6, 2006, entitled "Hand-Held Powered Tap Driver."

BACKGROUND OF THE INVENTION

"Tapping" is a cutting process in which a tap is rotated into a starting hole in a workpiece. The workpiece is usually metal, and the starting hole is usually slightly larger than the thread root diameter. The tap has threads formed thereon in a configuration corresponding to the threads to be cut in the workpiece. It is fluted to form cutting edges and provide for chip clearance. In workshop environments, when the starting hole is to be tapped, the tap is usually held in a tap wrench and is manually rotated while it is pressed into the starting hole. The tap must be started axially into the starting hole. The front, entry end of the tap is tapered so that the full cut of the threads is not taken by the first tap threads. This permits entry of the tap into the starting hole. The tap is rotated in the clockwise direction (for right-hand threads) and is pressed into the starting hole at the same time, which requires care and dexterity.

After chip cutting is started and chips are forming, it is desirable to rotate the tap in the unscrewing direction to break loose the cut chips. When there are four flutes on the tap, it is desirable to advance the tap in the cutting direction more than half a turn and then back and out more than a quarter turn. In workshop environments, tapping has previously been done by hand. It is desirable to provide a hand-held powered tap driver for an artisan or a workman. The hand-held powered tap driver should be light and easy to handle so that an artisan can easily and quickly create tapped holes.

SUMMARY OF THE INVENTION

In order to aid in the understanding of this invention, it can be stated in essentially summary form that it is directed to a hand-held powered tap driver which has a body. The body has a drive shaft which carries a tap chuck for rotation around the axis of the drive shaft. A motor is mounted in the body and is connected to drive the drive shaft. A manually accessible switch on the body causes energization of the motor. The energization is such as to cause rotation of the tap in the tapping direction. A control circuit periodically causes reversing of the tap to partially withdraw it from the tapped hole to break the chips. When tapping is complete and the workman wants to withdraw the tap, he presses a reverse switch which rotates the tap out of the tapped hole.

It is thus, a purpose and advantage of this invention to provide a hand-held tap driver which is easy to use and which conveniently presents a tap to a hole and drives it in tapping manner into the hole.

It is another purpose and advantage of this invention to provide a hand-held tap driver wherein energization in the forward direction is caused by actuating a switch on the body of the tap driver, and withdrawal of the tap is accomplished by actuating a reverse switch which rotates the tap out the tapped hole.

It is another purpose and advantage of this invention to provide a hand-held powered tap driver which automatically makes intermittent forward cutting rotations of the tap interspersed with reverse motion of a smaller angular amount so that the tap is intermittently forwardly driven to tap a hole in the workpiece.

It is a further purpose and advantage of this invention to provide a hand-held powered tap driver which senses the tapping torque and when the tapping torque reaches a selected value, reverse rotates the tap for less than one turn to loosen the chips.

It is another purpose and advantage of this invention to provide a unitary structure which contains all the necessary equipment in a hand-held body so that tapping can be accomplished by appropriately pressing the tap into the starting hole and actuating forward and reversing switches to accomplish tapping and removal of the tap from the tapped hole.

Other purposes and advantages of this invention will become apparent from a study of the following portion of the specification.

DESCRIPTION OF THE PREFERRED EMBODIMENTS

Figure 1:
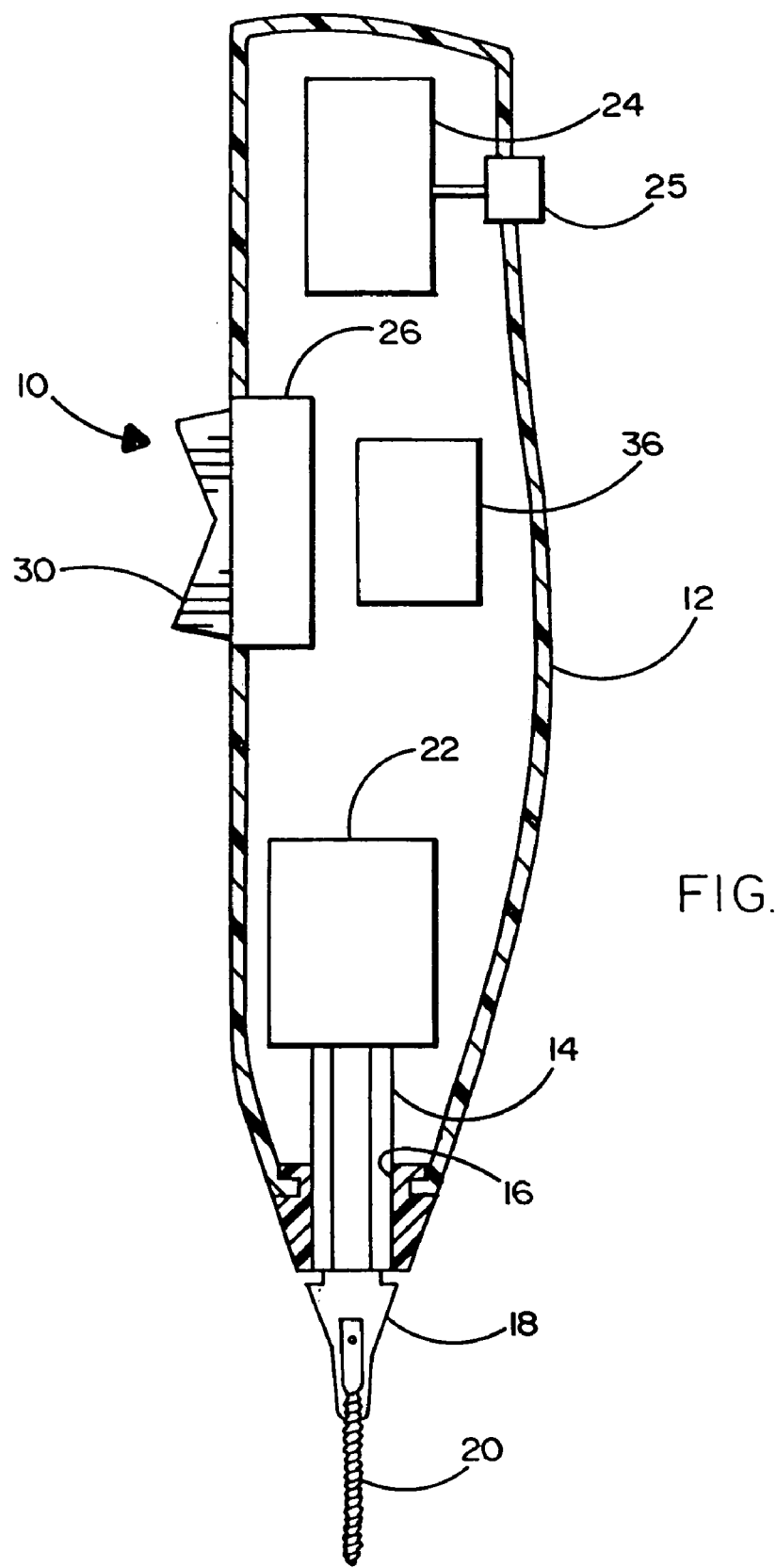
FIG. 1 is a side-elevational view of the hand-held powered tap driver this invention with the near cover piece removed.

The hand-held powered tap driver of this invention is generally indicated at 10 in FIG. 1. It has a body 12 which is sized and configured to be conveniently held in the hand. In FIG. 1, the near cover of the body has been removed to show the interior structure. When the driver 10 is complete, the devices seen in FIG. 1 are enclosed. Drive shaft 14 is rotatably mounted in bearing 16 at the tap end of the body. Drive shaft 14 carries chuck 18 in which tap 20 is removably mounted. Shaft 14 is connected to motor 22 and is rotatable in bearing 16. The motor 22 is reversible.

Body 12 contains a power supply, which may be an external plugin to a central supply system. However, in order to be completely portable, the power supply is preferably a battery 24. The battery 24 is preferably a rechargeable battery with a suitable external tap 25 for connection to a recharging source. The battery is connected through line 28 to the control switch 26, see FIG. 2. Control switch 26 is a double-throw switch with the unactuated position being normally off. The control switch 26 is a rocker switch with its rocker 30 being rockable downward toward the tap 20, see FIG. 1, or upwards. When rocked downward, the switchblade 32 energizes line 34 to signal forward rotation of the motor 22 to cause the tap to rotate in the clockwise, cutting direction. The energization of line 34 acts through reversing circuit 36 which initially energizes line 38 to rotate the motor in the forward, tapping direction.

Figure 2:
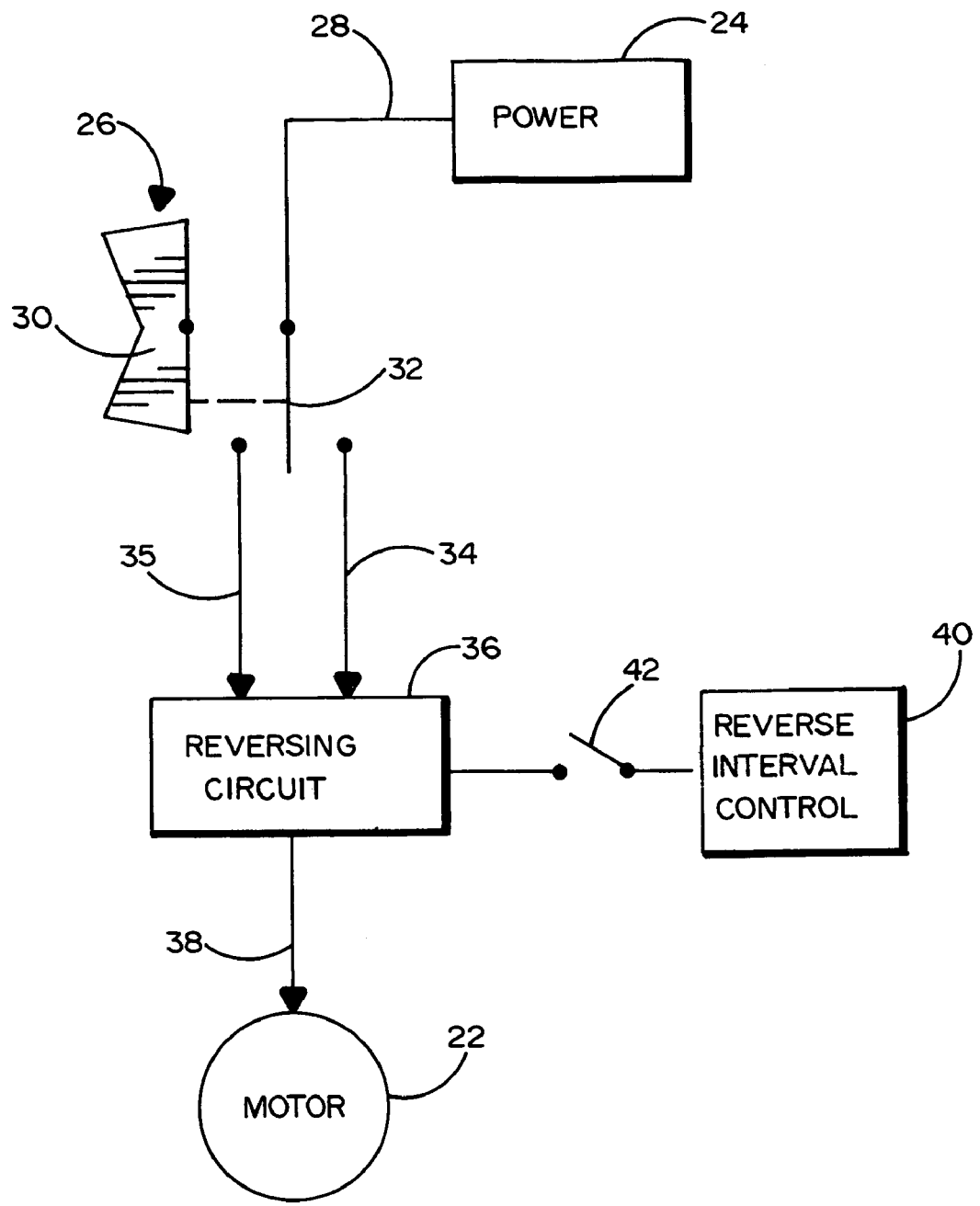
FIG. 2 is a functional block diagram of the circuitry in the tap driver.

As discussed above, it is desirable to reverse the tap at appropriate times to break loose the chips which are cut during tapping. As seen in FIG. 2, timer 40 is connected to the reversing circuit through switch 42. Switch 42 is normally closed. As tapping proceeds, the timer 40 actuates the reversing circuit to reverse the motor and the tap for a short time period. When this occurs, the tap reverses long enough in time and far enough in rotation to break loose the chips. A one-quarter revolution is all that is necessary. After the timer 40 times out, the reversing circuit 36 drives the motor in the forward direction as long as the rocker switch is actuated to energize line 34. As long as the rocker switch is in this position, the tap rotates forward for a time predetermined by timer 40. This time is preferably sufficient to provide for about one turn of the tap. When the timer times out, reversing occurs for the time equivalent to about one-quarter of a reverse turn. When tapping is complete, the rocker switch is actuated to energize line 35 to reverse the tap out of the newly tapped hole. In the reverse direction, the timer 40 is not effective.

Switch 42 is provided so that this timed reversal does not occur. When timer switch 42 is open, the motor rotation is controlled only by rocker switch 26. This is useful when tapping thin metal. It is also useful for driving devices other than taps, such as screws or drills.

Figure 3:
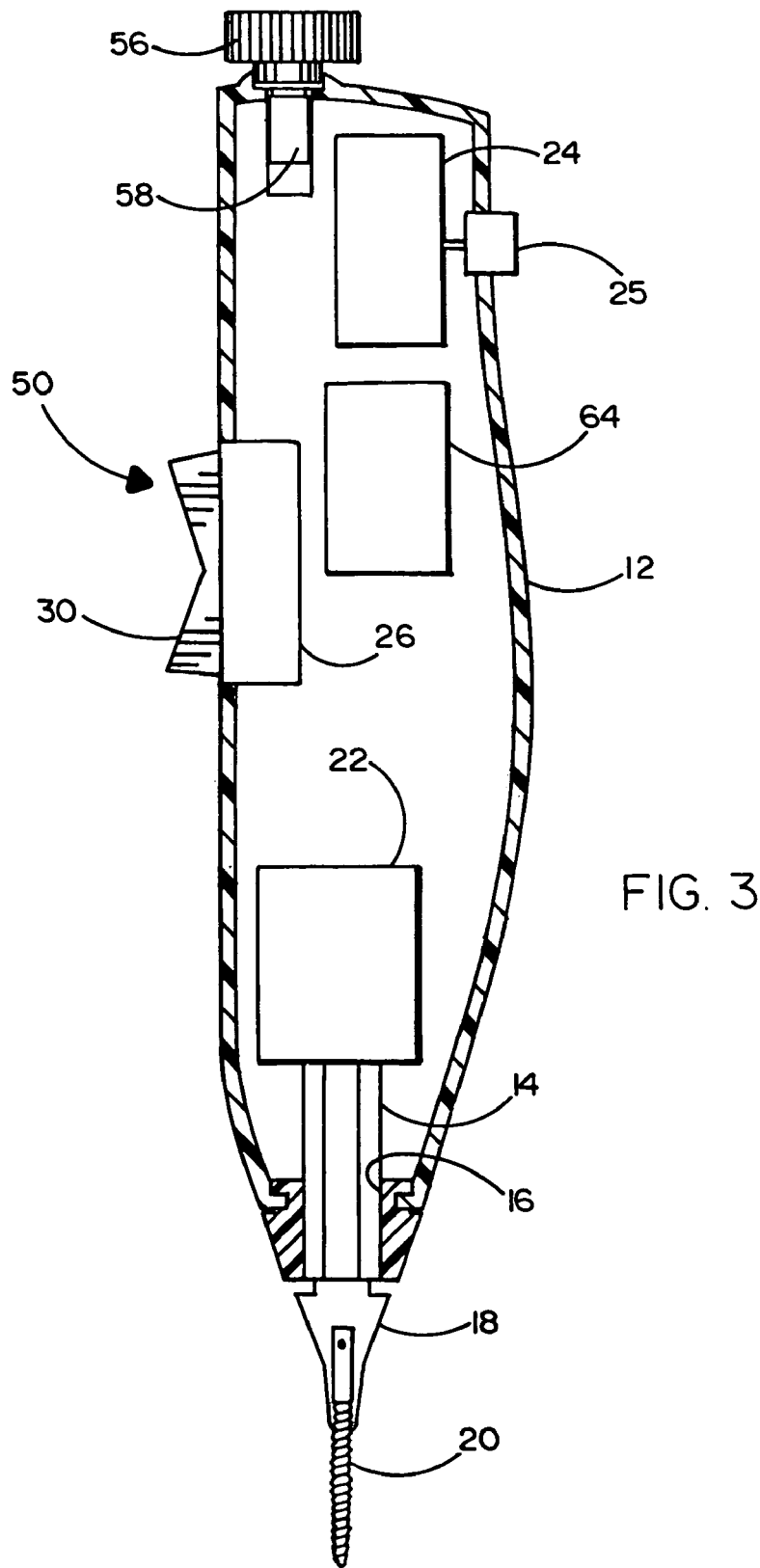
FIG. 3 is a side-elevational view, similar to FIG. 1, of a second preferred embodiment of the hand-held powered tap driver of this invention with the near cover removed.
Figure 4:
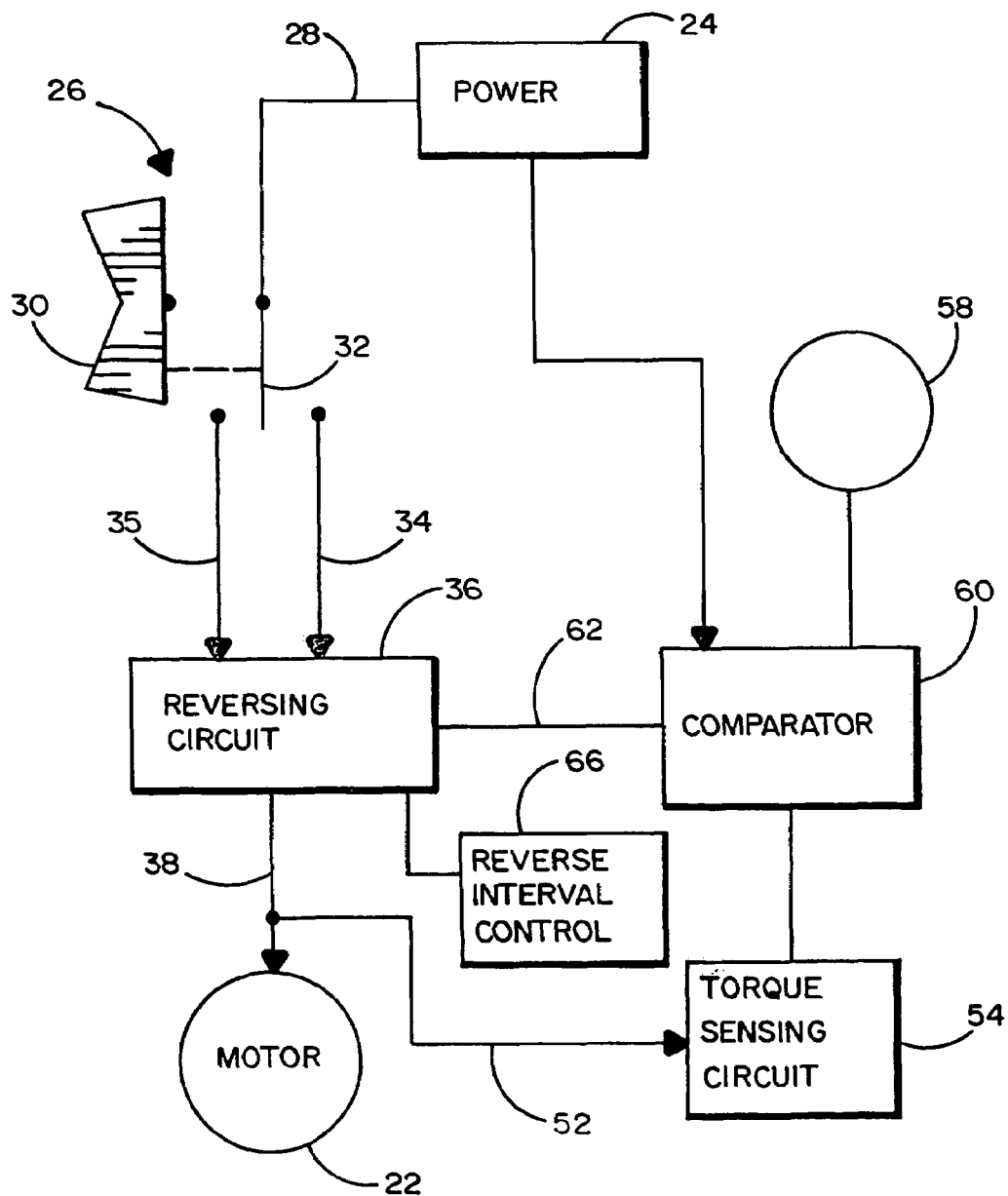
FIG. 4 is a schematic electrical diagram of the circuitry used in connection with the embodiment of FIG. 3.
Figure 5:
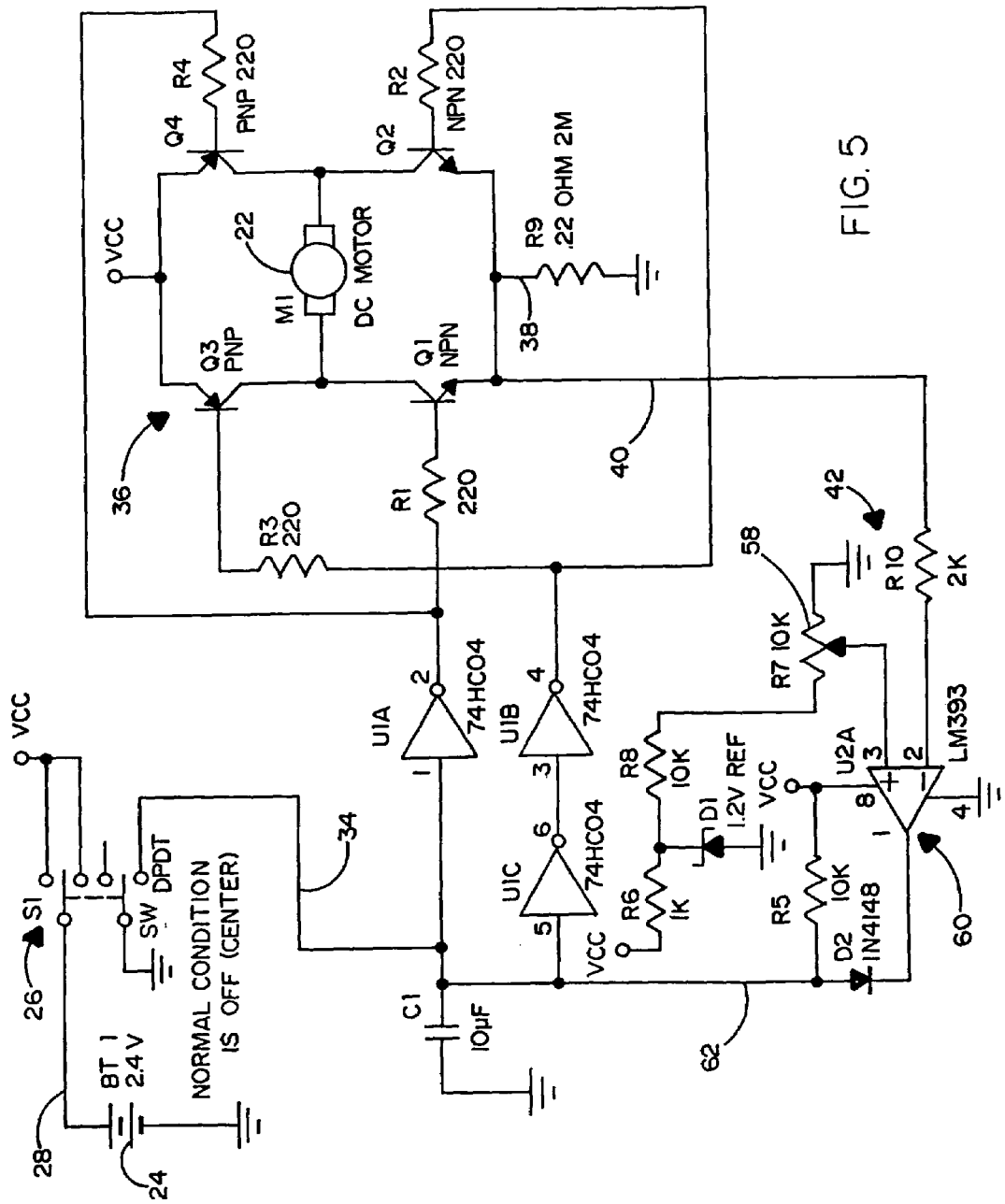
FIG. 5 is a further detailed schematic electrical diagram of the circuitry employed with the embodiment shown in FIG. 3.

FIGS. 3, 4 and 5 illustrate an embodiment of a tap driver 50 which has most of the same physical characteristics. In this embodiment, the reversal of the tap is directed by torque instead of time. Torque is sensed by motor current in line 38 with the sensor line 52 connecting the motor current signal to the motor current sensing circuit 54. The motor current and motor torque are related. The torque should be selectable, in accordance with tap size and material being tapped. There are other factors which influence the amount of tapping torque, but these are the most significant ones. In order to accommodate for these differences in tapping torque, an external torque selecting knob 56 is provided. This adjusts the potentiometer 58, which is supplied from a constant voltage circuit, see FIG. 5. The motor current signal and the torque set point signal are compared in comparator 60. When the torque reaches the preselected set point, a signal in line 62 causes reversal of the reversing circuit 36. Now, the motor is energized by reversing circuit 36 to rotate in the tap unscrewing direction. It is desirable that the tap rotate in the unscrewing direction for about a one-half turn to break loose the chips, to reduce the tapping torque.

Timer 66 permits the motor to drive the tap in the unscrewing position for about half a turn. Thereupon, the timer times out. Since low forward torque is sensed, the torque sensing circuit 54 energizes the motor 22 to rotate in the tapping direction. This forward tapping rotation continues until the torque set point is reached, whereupon a reversal again takes place. This action continues until the workman has determined that the tapping is complete. When tapping is complete, the workman releases the rocker 30 from the forward, tapping position and rotates it upward to the tap removal position. In this position, the line 35 is energized. This causes the reversing circuit 36 to rotate the motor 22 in the tap unscrewing direction. As long as the rocker switch is in this position, the motor continues in that rotation to rotate the tap free of the newly tapped hole. For convenience, most of the circuitry can be collected together and mounted in a control circuit board 64.

This invention has been described in its preferred embodiment, and it is clear that it is susceptible to numerous modifications and embodiments within the ability of those skilled in the art. Accordingly, the scope of this invention is defined by the scope of the following claims.

What is claimed is:

1. A hand-held powered tap driver comprising:
a body, a tap-holding chuck rotatably mounted on said body for rotation in a first rotary direction and in a second rotary direction;
structure in said body to automatically repetitively first drive said tap chuck in said first rotary direction a sufficient rotary amount to cut threads and then drive said chuck in said second rotary direction for a lesser rotary amount so that a tap held in said tap chuck is automatically repetitively rotated in said first rotary direction a first rotary amount and in said second rotary direction a lesser rotary amount to clear chips as the tap cuts threads in a workpiece, said structure further including a manually operable switch having first and second positions connected so that when said switch is manually actuated to said first position, said tap chuck is automatically repetitively rotated in said first and second rotary directions, said manually operable switch being connected so that when it is in said second position, said tap chuck is rotated in said second rotary direction.

2. A hand-held powered tap driver comprising:
a body, a tap-holding chuck rotatably mounted on said body for rotation in a first rotary direction and in a second rotary direction;
structure on said body to repetitively first drive said tap chuck in its first rotary direction and then drive said chuck in its second rotary direction for a lesser amount so that a tap held in said tap chuck is repetitively rotated in said first rotary direction a first rotary amount sufficient to cut threads and in said second rotary direction a lesser rotary amount sufficient to clear chips as the tap cuts threads in a workpiece, said structure including a control circuit which includes a torque sensor to reverse said tap chuck when tapping torque is reached when rotating in said first rotary direction.

3. A hand-held powered tap driver comprising:
a body configured to be held in the user's hand, an electric motor mounted on said body, a tap-holding chuck mounted on said body, said motor being connected to rotate said chuck in a first forward tapping rotary direction to screw a tap into a hole to cause thread cutting and in a second reverse rotary direction to unscrew the tap from the threaded tap hole;
a control switch on said body, said control switch having a first position and a second position;
an electric circuit within said body connected to said control switch and to said motor so that when said switch is in said second reverse position, said motor is connected to rotate said chuck in a said second direction to withdraw a tap in said chuck and when said control switch is in said first position said control circuit is connected to rotate said tap chuck in said forward direction for a first rotational amount sufficient to cut threads and to periodically actuate said motor so that said chuck rotates in said reverse direction for a lesser rotational amount sufficient to release chips so that the tap in said tap chuck repeatedly rotates in said forward direction for tapping and rotates to a lesser amount in reverse direction for chip release so that tapping is accomplished by repeatedly the advancing the tap and withdrawing the tap.

4. The hand-held powered tap driver of claim 3 wherein said control switch is a rocker switch which is configured to have an intermediate position when said motor is unactuated.

5. The hand-held powered tap driver of claim 3 wherein said control circuit includes a torque sensor, said torque sensor being connected to reverse said motor when tapping torque reaches a selected value.

6. The hand-held powered tap driver of claim 3 wherein said control circuit includes a timer, said timer being connected to reverse said motor when said timer times out.

7. The hand-held powered tap driver of claim 6 wherein said circuitry has a disable switch therein to inactivate reversal of said tap chuck when said control switch is in said forward position.

8. The hand-held powered tap driver of claim 3 wherein said circuitry has a disable switch therein to inactivate reversal of said tap chuck when said control switch is in said forward position.

9. The hand-held powered tap driver of claim 8 wherein said control switch is a rocker switch which is configured to have an intermediate position when said motor is unactuated.

10. A hand-held powered tap driver comprising:
a body, said body being configured to be held in the hand, a control rocker switch mounted on said body, said control rocker switch having a rocker which extends from said body and can be actuated from an unactuated central position to a forward position and to a reverse position;
a motor within said body, a chuck extending at least partially outside of said body, said chuck being configured to hold a tap, said motor being connected to rotate said tap chuck in a tapping rotational direction or rotate said tap chuck in an unscrewing rotational direction;
a power supply within said body and a control system within said body, said power supply being connected to said control system and said control system being connected to said control rocker switch and to said motor so that when said control rocker switch is rocked to the forward position, said motor is energized to repeatedly intermittently rotate in the forward tapping rotational direction sufficiently to cause thread cutting and to a lesser rotational amount sufficient to break chips in the reverse unscrewing rotational direction so that a tap held in said tap chuck is repeatedly rotated forward and reverse rotational directions to repeatedly advance the tap into a workpiece to cut threads therein and break chips therein and when said rocker switch is rocked to the reverse rotational direction, said motor is reversed to reverse said tap chuck to unscrew the tap from the workpiece.

11. The hand-held powered tap driver of claim 10 wherein said power source includes a battery within said body.

12. The hand-held powered tap driver of claim 10 wherein said switch is a rocker switch which is configured to have an intermediate position when said motor is unactuated.

13. The hand-held powered tap driver of claim 10 wherein said control circuit which includes a timer to control the amount of repetitive tap chuck rotation in said forward rotary direction and in said reverse rotary direction.

14. The hand-held powered tap driver of claim 10 wherein said control circuit includes a torque sensor to reverse said tap chuck when a preselected tapping torque is reached when rotating in said forward rotational direction.

* * * * *